March 24, 1931.  A. F. WRIGHT ET AL  1,798,051
DIRIGIBLE HEADLIGHT
Filed July 31, 1929  2 Sheets-Sheet 1

WITNESS
G. B. Shillinger

INVENTOR
Arthur Ferman Wright and
Henry Houle
BY
ATTORNEY

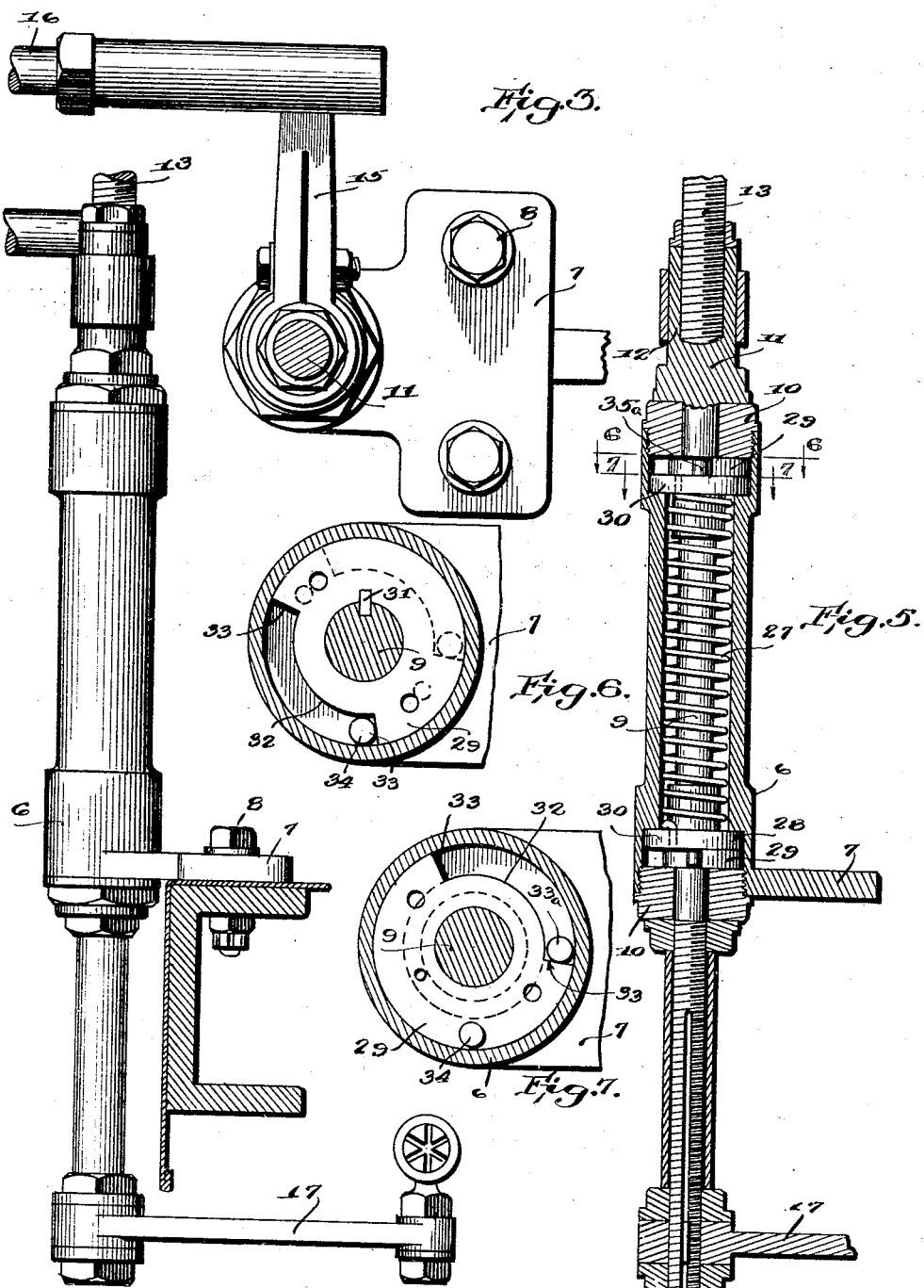

Patented Mar. 24, 1931

1,798,051

UNITED STATES PATENT OFFICE

ARTHUR F. WRIGHT AND HENRY HOULE, OF HELENA, MONTANA

DIRIGIBLE HEADLIGHT

Application filed July 31, 1929. Serial No. 382,468.

Our invention relates to automatic dirigible headlights for motor vehicles and an object thereof is to provide a headlight of this type wherein the lamps will occupy a true forward position regardless of wear on parts of the operating mechanism.

More specifically the invention provides a revoluble light support with which a coil spring is associated and arranged to be placed under tension upon turning of the light support in either direction, and thus cause the light support to be returned to a straight ahead position after each turning of the same by the vehicle steering mechanism.

With the preceding and other objects and advantages in mind, the invention consists in the novel combination of elements, constructions and arrangements of parts and operations to be hereinafter more fully described, claimed and illustrated in the accompanying drawings, wherein:

Fig. 3 is a detail view partly in elevation and partly in section;

Fig. 4 is a front elevation of one of the revoluble light supports mounted on the motor vehicle, the latter being shown in section;

Fig. 5 is a vertical sectional view of one of the revoluble lamp supports;

Fig. 6 is a horizontal section taken on line 6—6 of Fig. 5;

Fig. 7 is a similar view taken on line 7—7 of Fig. 5, and

Figure 1:
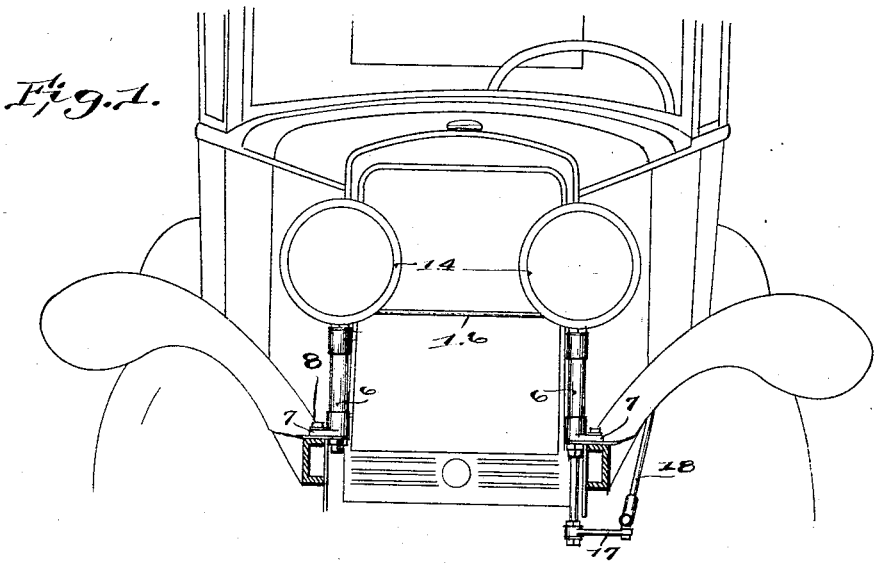
Figure 1 is a front elevation of a motor vehicle equipped with my invention; with parts of the vehicle chassis being shown in transverse section.

Referring to the invention in detail a conventional motor vehicle 5 is provided and arranged at the front thereof is a pair of vertically extending tubular standards 6, each of the latter being formed with a laterally extending bracket or plate 7 which is bolted or otherwise secured to one of the chassis side bars as at 8.

Extending centrally through each of the standards 6 is a revoluble lamp support 9 which is journalled in bushings 10 threaded into the opposite ends of the standards.

The upper ends of the lamp supports are formed with enlarged parts 11 having vertical bores 12, each of which receives one of the attaching shanks 13 depending from each of the headlights 14. A rearwardly and laterally extending arm 15 is fixed to the enlarged portion 11 of each of the lamp supports and are operatively connected by a tie rod 16 which extends transversely of the motor vehicle and causes the lamps to turn in synchronism.

Figures 2, 8:
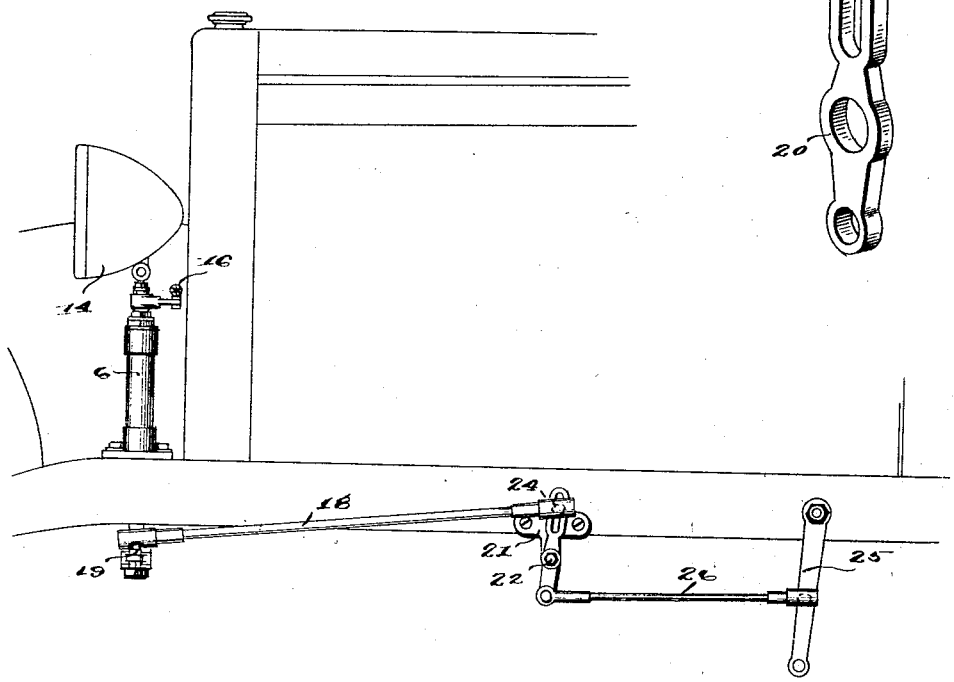
Fig. 2 is a side elevation of the same.
Fig. 8 is a perspective view of a rocker arm employed in the invention.

As particularly illustrated in Fig. 1 one of the revoluble lamp supports extends a considerable distance below its standard and carries a laterally extending arm 17, the latter having operative connection with a forwardly and rearwardly shiftable rod 18 disposed upon one side of the motor vehicle chassis as disclosed in Fig. 2. As disclosed in this figure the forward end of the rod 18 is connected with the arm 17 by a ball and socket connection indicated at 19.

In order to shift the rod 18 incident to the turning of the vehicle steering mechanism, a rocker arm 20 is mounted on a plate 21 for movement about a horizontal axis 22. Preferably this plate 21 is anchored to one of the side bars of the motor vehicle chassis. At its upper end the rocker arm is formed with a slotted yoke 23 which receives a universally mounted stud 24 carried by the rear end of the rod 18. The usual steering arm 25 of a motor vehicle steering mechanism is operatively connected with the rocker 20 by a link rod 26 so that upon the usual movement of the arm 25 to steer the motor vehicle the lamp support 9 will be correspondingly moved to follow the course of the motor vehicle.

In order to at all times cause the head lights 14 to assume a true forward position means are provided for automatically returning them to this position, comprising a coil spring 27 encircling each of the revoluble light supports and located within each of the tubular standards. Pairs of cooperating disks 28 and 29 are arranged within the opposite ends of each of the tubular standards.

The disks 28 are loosely received on the lamp support and the ends of the spring 27 are anchored thereto as at 30. The disks 29 are revoluble with the lamp support by keys 31 engaging these disks 29 and the lamp support. As particularly illustrated in Figs. 6 and 7 the disks are formed with arcuate recesses 32 which afford shoulders 33 on each disk. A lug 34 depends from the under face of the disk 29 and lies within the recess 32 of its companion disk 28. A similar lug 35a projects from the upper face of the disk 28 and lies within the recess 32 of its companion disk 29. Lugs 33a are formed within the ends of the hollow standard and engage one of the shoulders of each of the disks 29 so that these disks are free to rotate in one direction only.

From the disclosure it will be manifest that when the lamps are rotated the springs 27 will be tensioned to return the lamps to a straight ahead position. In this connection it is pointed out that turning of the lamp supports 9 in one direction causes the disks 28 and 29 of the upper end of the hollow standard to rotate together to tension the spring. Rotation in the reverse direction causes the disks at the lower end of the hollow standard to be rotated together and thus tension the spring.

We claim:

In a dirigible headlight support, a tubular standard having the bore thereof enlarged at either end whereby to form sockets, a revoluble lamp support passing through the tubular standard, a stop in each socket of the tubular standard, a loosely mounted disk in each socket, and each of which having a pair of spaced shoulders, one shoulder of each disk being engaged with one of the stops so that the disk will be held against rotation in one direction, a companion disk in each socket of the tubular standard and fixed to the revoluble lamp support, each of the companion disks being provided with a pair of spaced shoulders, and a lug projecting from each companion disk and engageable with one of the shoulders of the other disk, and an expansible coil spring in the tubular standard extending between said sockets and having its ends engaged with the first mentioned disks whereby rotation of the lamp support in either direction will place the spring under tension and return it to normal position after each rotation of the same, said stops and disks being held from vertical movement by reason of being disposed in said sockets.

ARTHUR F. WRIGHT.
HENRY HOULE.